United States Patent [19]

Hucker

[11] 4,099,076
[45] Jul. 4, 1978

[54] DAMPED ROTOR FOR A MULTI-CHANNEL GENERATING SYSTEM

[75] Inventor: David J. Hucker, Rockford, Ill.

[73] Assignee: Sundstrand Corporation, Rockford, Ill.

[21] Appl. No.: 798,074

[22] Filed: May 18, 1977

[51] Int. Cl.² .............................................. H02K 3/20
[52] U.S. Cl. ................................... 310/183; 307/84; 310/269; 322/47; 322/51
[58] Field of Search ............. 310/182, 183, 211, 197, 310/269; 307/82, 84, 153, 51, 47; 322/47, 49–51

[56] References Cited

U.S. PATENT DOCUMENTS

| | | | |
|---|---|---|---|
| 2,768,317 | 10/1956 | Porter | 310/183 |
| 2,884,549 | 4/1959 | Halliday | 310/183 |
| 3,230,487 | 1/1966 | Pellecchia | 310/183 X |
| 3,239,703 | 3/1966 | Long et al. | 310/183 |
| 3,256,454 | 6/1966 | Redwood | 310/183 |

Primary Examiner—Mark O. Budd
Attorney, Agent, or Firm—Wegner, Stellman, McCord, Wiles & Wood

[57] ABSTRACT

An improved rotor assembly for a generator used in a multi-channel parallel electrical generating system. A plurality of laminated sections, each having N outwardly extending poles, are stacked to form a rotor. Field windings are wound around the N poles and damper turns are wound around adjacent pole pairs to reduce the mutual flux coupling between the rotor and the stator, thereby reducing the fundamental component of torque between the rotor and the stator.

8 Claims, 5 Drawing Figures

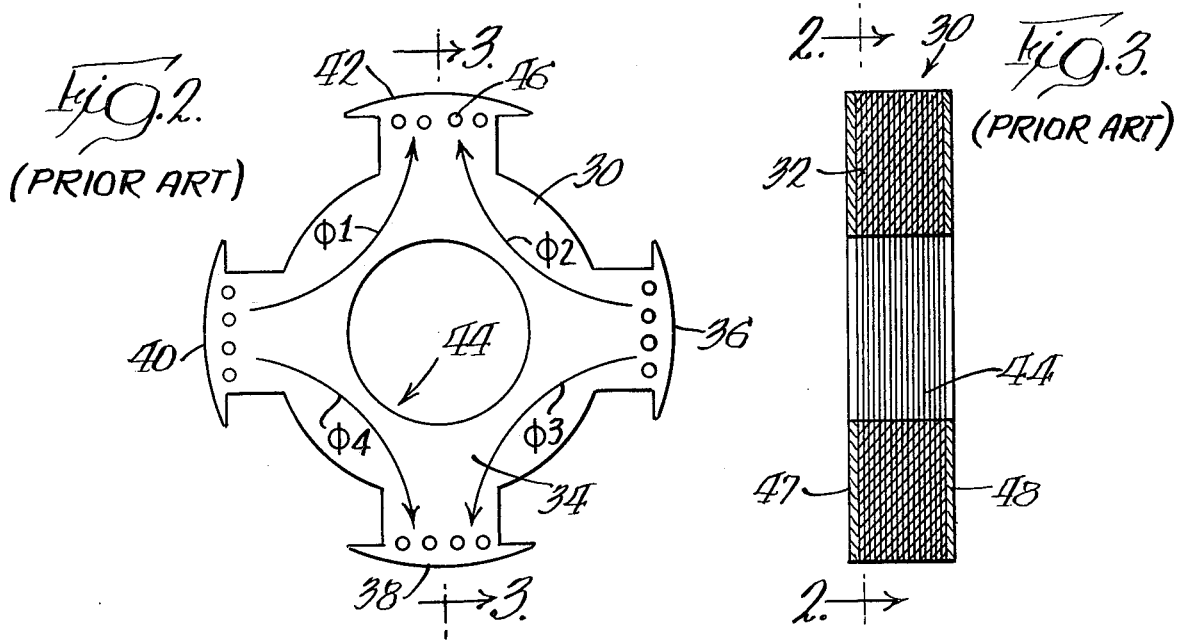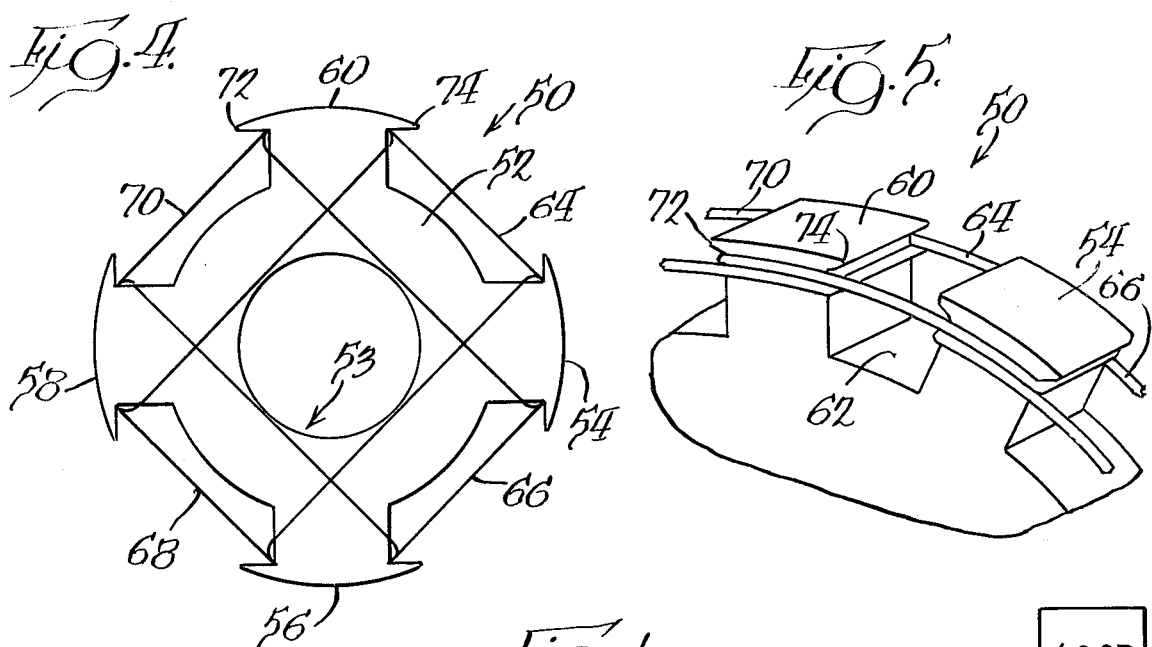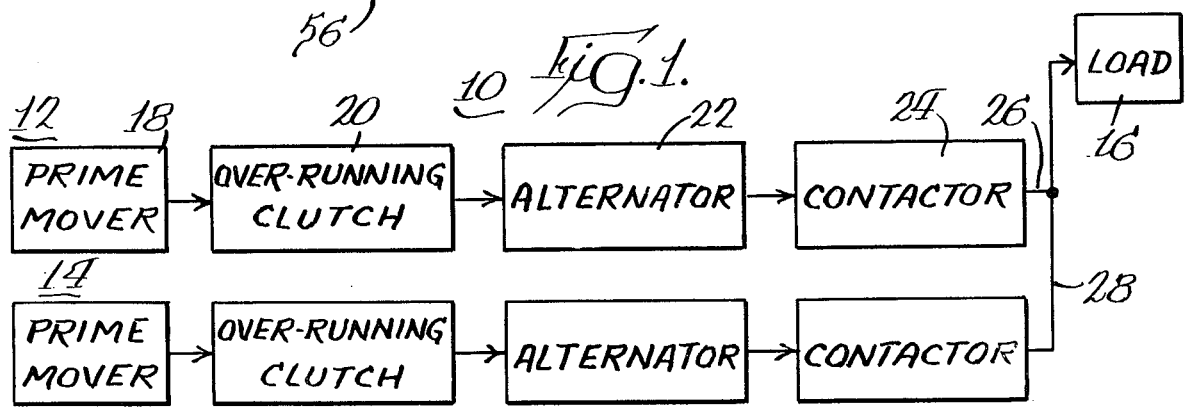

DAMPED ROTOR FOR A MULTI-CHANNEL GENERATING SYSTEM

BACKGROUND OF THE INVENTION

This invention relates to electrical machinery and, more particularly, to an improved rotor assembly for electric machines.

An electrical generating system may be coupled to similar systems in parallel to form a multi-channel generating system. The multi-channel system provides continuous current flow to a load. Each channel has an alternator and each alternator has a rotor and a stator. A stator voltage acting upon the rotor establishes a flux coupling between the rotor and the stator. Because of the flux coupling, motoring of a rotor can occur when its prime mover has been disconnected from the system and its field windings have been deenergized. To overcome this problem over-running clutches have been used to mechanically disconnect the rotor from the prime mover when the generating system is to be removed from the other generating systems. However, the use of over-running clutches has not always been desirable since they are often of questionable reliability. Also, shorted damper bars have been inserted at the ends of the poles of the rotor to improve the response of the rotor to voltages impressed by the stator. This particular structure is typical of synchronous generators and has a large mutual flux coupling between the rotor and the stator. It is not desirable for use in multi-channel generating systems because it acts as an induction motor when energized by other generating systems.

Accordingly, I have developed an improved rotor assembly for an electrical generating system which is not greatly affected by voltages impressed upon it by the stator and has a reduced mutual coupling between the stator and the rotor.

SUMMARY OF THE INVENTION

Damper turns are wound around alternate pairs of poles of an N pole rotor to reduce the mutual flux coupling (and therefore the torque) between the rotor and the stator of an alternator in an electrical generating system. The term "alternate pairs of poles" as used herein refers to pairs of adjacent poles which are of opposite electrical polarity. The damper turns provide a short circuit path length between the alternate pairs of poles and may be placed above the field windings close to the air gap or, if desired, between the field windings and the center of the rotor. The damper turns may be a single strand of wire insulated from the field windings and the rotor.

It is a feature of the present invention to reduce the mutual flux coupling between the rotor and the stator in a multi-channel electrical generating system.

Another feature of the present invention is to reduce the flux coupling between the rotor and the stator in a multi-channel generating system while providing a rotor which is not greatly affected by voltages impressed on it by the other stators in the system.

Yet another feature of the present invention is to provide an improved rotor in an alternator of a multi-channel generating system which spins synchronously with low losses, low stator current and minimum torque when the field windings of the rotor are unexcited.

Other features will become apparent when considering the specification and the drawing in which:

DRAWING

FIG. 1 is a block diagram of a multi-channel parallel electrical generating system;

FIGS. 2 and 3 depict a rotor known to the prior art;

FIG. 4 is a front view of the improved rotor in accordance with the present invention; and FIG. 5 is a perspective view of an alternate pair of poles of the improved rotor having the damper turns.

DESCRIPTION OF PREFERRED EMBODIMENT

Referring to FIG. 1, a multi-channel generating system is shown. The system includes two channels 12 and 14 which provide power to load 16. Although only two channels are shown, the multi-generating system 10 may have any number of parallel-connected channels. Each channel is similar to the others, and channel 12 will now be explained.

Channel 12 includes prime mover 18 over-running clutch 20, alternator 22 and contactor 24. The output 26 is coupled to bus bar 28 which receives the outputs from all the channels. During operation, prime mover 18, coupled through over-running clutch 20, drives the rotor of alternator 22. The current for alternator 22 is applied to contactor 24 which is normally closed when the current developed by alternator 22 is of the appropriate frequency and voltage. The contactor 24 provides an open circuit to current flow in the event that the prime mover 18 drives the rotor of alternator 22 at an inappropriate speed and over-running clutch 20 does not disengage. A plurality of alternator channels coupled in parallel assures that load 16 is provided with current having the correct frequency and amplitude at all times. In the event that one of the channels malfunctions to provide current at an unacceptable level or frequency, the over-running clutch 20 and the contactor 24 cooperate to remove the channel from the system. There are instances, however, when the contactor or the over-running clutch malfunctions and does not disconnect the malfunctioning channel from the system. In such a case, the current provided by the other channels may feed back to the malfunctioning channel to impress a voltage upon the stator of the alternator. A voltage so impressed upon the stator of an alternator has the tendency to develop torque as a result of the flux coupling between the rotor and the stator. This may cause the rotor to motor the prime mover even when the field winding of the rotor is unenergized. This is not a desirable condition, and the improved rotor of the present invention lessens the mutual flux coupling between the rotor and the stator of the alternator, permitting the rotor to spin synchronously with low losses, low stator current and minimum torque.

Various attempts have been made to overcome the motoring of the rotor in the multi-channel generating system 10. These attempts include modifications to the rotor of alternator 22. For example, a prior art salient pole rotor 30 is shown in FIGS. 2 and 3. Rotor 30 is a stack of similar laminated sections 32, each section have a center 34 and outwardly extending poles 36, 38, 40 and 42. Center hole 44 accommodates the shaft (not shown). Each pole is provided with several conducting bars, as bar 46 in pole 42. The conducting bars extend through the stack of laminated sections 32. Field windings (not shown) are wound around poles 36, 38, 40 and 42 in the well known manner. Conductive plates 47 and 48 are provided on each end of rotor 30 to short-circuit the conductive bars. This particular structure is known as a squirrel cage rotor and adjacent poles forming a pair of poles are linked by fluxes $\phi_1$, $\phi_2$, $\phi_3$ and $\phi_4$, as shown. The squirrel cage construction maintains the flux in a pole at a relatively constant level during operation. When the flux in the pole is constant, the alternator maintains improved voltage balance during the presence of unbalanced stator currents created by unbalanced load impedances. Unfortunately, however, the structure shown in FIGS. 2 and 3 is also a classic torque-producing induction rotor when it is used with alternator 22 of the multi-channel generating system 10. If the stator of the alternator is energized by other stators in the parallel system, as for example the stator from the alternator in channel 14 (FIG. 1), torque will be imparted to rotor 10 even when the field windings are deenergized.

Referring to FIG. 4, the improved rotor structure is shown. Rotor 50 has a center 52 from which outwardly projecting poles 54, 56, 58 and 60 extend. Field windings are received in the recesses, as recess 62, between adjacent poles in the well known manner. Individual damper turns 64, 66, 68 and 70 are wound around adjacent poles as shown. Specifically, damper turn 66 is wound around poles 54 and 56, damper turn 68 is wound around poles 56 and 58, damper turn 70 is wound around poles 58 and 60, and damper turn 64 is wound around poles 60 and 54. The individual damper turns are insulated from each other and from the field windings to provide short circuit current paths linking alternate pairs of poles 54-56, 56-58, 58-60 and 60-54. The sum of the fluxes in the alternate pairs of poles is held relatively constant in a manner similar to the prior art construction shown in FIGS. 2 and 3. The damper turns also provide a low rotor impedance as seen by the stator so that unbalanced stator currents do not cause excessive unbalanced voltages to develop within the stator.

Since the damper turns reduce the impedance of the stator winding with respect to the impressed stator voltage in a multi-channel system, it becomes more advantageous to place each damper turn as close to the stator winding as possible. Thus, as shown in FIG. 5, the single strand damper turn 64 connected between poles 60 and 54 is provided at the top of the outwardly extending poles under the circumferentially projecting lips 72 and 74. The field windings (not shown) are located between the damper turns and the center of the rotor 50.

It is apparent that the technique of providing damper turns to the alternate pairs of poles applies not only to a four-pole salient rotor as shown in FIG. 4, but to a rotor having N poles, as well. This is more clearly shown in FIG. 5, where adjacent poles 60 and 54 have been brought closer together for purposes of illustration. In fact, a rotor having a greater number of poles, defining smaller circular arcs between adjacent pole tips, will perform even more satisfactorily since there is less reluctance torque created in such a structure.

I claim:

1. A rotor for an alternator in a multi-channel generating system comprising:
    a plurality of laminated sections, each section having a center and N outwardly extending poles therefrom stacked to form a rotor;
    field windings wound around the N poles; and
    damper turns electrically insulated from the field windings wound around each pair of adjacent poles of opposite polarity for providing a short circuit current path linking the pair of adjacent poles of opposite polarity.

2. The rotor of claim 1 wherein the damper turns are above the field windings.

3. The rotor of claim 1 wherein the damper turns are individual insulated conductors.

4. In a generating system having a plurality of alternator channels, each channel having an alternator and each alternator having a rotor and a stator, the stators of the alternators being connected in parallel for providing current to a load, the rotors of the alternators being coupled to prime movers, each rotor having N number of poles, field winding recesses between adjacent poles, field windings wound around the N poles and located in the recesses, the improvement comprising:
    damper turns on each rotor for providing a short circuit current path linking alternate pairs of poles on the rotor.

5. The generating system of claim 4 wherein the damper turns are between the field windings and the stator.

6. The generating system of claim 5 wherein the damper turns include:
    N insulated conductors, each conductor wrapped around two adjacent poles.

7. The generating system of claim 6 wherein each conductor is a single strand of wire.

8. The generating system of claim 4 wherein the N poles have circumferentially extending lips at their ends and the damper turns are under the lips above the field windings.

* * * * *